United States Patent [19]

Rausch

[11] Patent Number: 4,681,558
[45] Date of Patent: Jul. 21, 1987

[54] REINFORCED POLYMERIC COMPONENT AND METHOD OF MANUFACTURE

[75] Inventor: Doyle W. Rausch, Niles, Mich.

[73] Assignee: National Standard Company, Niles, Mich.

[21] Appl. No.: 724,604

[22] Filed: Apr. 18, 1985

[51] Int. Cl.⁴ ............................................. F16G 5/10
[52] U.S. Cl. .................................... 474/205; 474/263; 156/137
[58] Field of Search ............... 474/205, 260, 262, 263, 474/268; 428/36, 167, 377; 156/137–140, 142

[56] References Cited

U.S. PATENT DOCUMENTS

| 2,739,090 | 3/1956 | Waugh | 474/263 X |
| 4,395,298 | 7/1983 | Wetzel et al. | 156/137 |
| 4,915,397 | 11/1983 | Wetzel | 474/205 X |

Primary Examiner—Stephen I. Novosad
Assistant Examiner—Thuy M. Bui
Attorney, Agent, or Firm—Emrich & Dithmar

[57] ABSTRACT

A reinforced belt assembly or construction which utilizes a reinforcing material comprised of a reinforcing member portion possessing a high Young's modulus discontinuous throughout the length of the reinforcing material and a carrier member portion extending the length of the reinforcing material. The carrier member portion facilitates transport and winding of the reinforcing material about a forming mandel during manufacture and facilitates cutting of the belt assembly from the cured reinforced sleeve material such that the high Young's modulus member does not emerge from the cut sidewalls of the belt assembly.

84 Claims, 13 Drawing Figures

4,681,558

REINFORCED POLYMERIC COMPONENT AND METHOD OF MANUFACTURE

BACKGROUND OF THE INVENTION

The present invention relates to a novel reinforcement member for flexible drive belts and, more particularly, to a novel reinforcement member and method of manufacturing timing belts. The present application is related to a co-pending application Ser. No. 724,610, filed in the name of the present inventor and assigned to the assignee of the present invention.

Timing belts are flexible drive belts, similar to pulley-type belts, which have teeth on one or more sides of the belt which permits the belt to perform much as gears perform in transmitting precise precision motion. Timing belts, also known as synchronous belts, generally do not transmit the amount of power that a gear will transmit, but offer light weight and alignment flexibility with the advantage of non-slip precision motion transmission. In such precision motion transmission, the motion is transmitted by the pulley teeth meshing with the belt teeth and during the meshing operation of the engagement and disengagement of the teeth, relative movements take place between the pulley teeth and the belt teeth. Accordingly, several prior art structures and compositions have been suggested for manufacturing belt structures which provide a high degree of flexibility while maintaining the necessary wear and life characteristics of the belt.

Belts for transmitting motion have been known for many years, as evidenced by U.S. Pat. Nos. 1,928,869, 1,611,829, 3,464,875 and 4,266,937 which describe processes in which the cogs or teeth are preformed in some manner and placed about a drum and then the remaining portion of the belt components or belt sleeve is wrapped around the teeth to form the completed uncured belt sleeve. More recently U.S. Pat. No. 4,487,814 describes a belt construction and the method of manufacture of the same.

Conventional timing belt constructions for industrial use, which include V-belts and drive belts constructions, are generally comprised of a polymeric matrix material, such as, rubber or polyurethane, and the like, reinforced with a higher strength material, primarily glass, fabric or an arumid, and with an even higher Young's modulus filament, primarily metal, so as to resist stretching and maintain precise belt-tooth spacing under operating load conditions. Moreover, such timing belts, containing glass or fabric reinforcements, generally do not possess sufficient Young's modulus coefficients to withstand stretching or elongation of the belt during operating loads. Thus, the preferred reinforcement is generally a metal, such as steel.

Although, timing belts comprised of rubber reinforced with metal filaments, such as steel cables and the like have been suggested, such belts structures present problems relating to corrosion of the metal within the belt, slipping and fatigue of the metal during operating load, adhesion problems with respect to the metal to the rubber reinforced belt construction and the difficulty of producing a belt construction possessing the necessary flexibility and strength required in order to effectively utilize steel as a reinforcing member of the belt. The flexibility of the belt is necessary to prevent, during the operating load conditions of the belt motion transmitted from the pulley teeth meshing with the belt teeth, the engagement and disengagement of the pulley teeth and the belt teeth with respect to each other, which action results in substantial teeth wear in that portion of the belt construction.

Importantly, also, and perhaps the most important difficulty associated with the use of steel as the reinforcement tensile member within a belt construction, relates to the difficulties associated with the use of steel in the method of manufacturing for timing belts. In general, timing or drive belts are manufactured by applying an inner rubber reinforced layer from a continuous sheet around a mandrel drum having an outer surface longitudinally grooved, which grooves provide the internal teeth molded structure in the timing belt construction. Thus, initially, a continuous layer of uncured rubber reinforced material is positioned and layed around the mandrel to form a tubular sleeve of material. Conventionally, a reinforcement cord or filament is then wrapped about the inner reinforced sheet of rubber continuously across down the length of the tubular sleeve. Next, an outer rubber protective layer is stitched and wrapped about the reinforcement cord or filament wrap and the resultant uncured long layered tube of rubber reinforced material is placed in a curing apparatus to cure the composite structure. Thereafter, cutting knives are positioned adjacent the sleeve to cut predetermined widths of the timing belts off of the formed and cured composite sleeve to produce the dimensioned timing belt, as desired. However, during the cutting operation of the layered and cured sleeve, the reinforcement material is cut and exposed at the sides of the cut belt. Such exposed steel ends behave poorly in use and cause difficulty during the cutting operations. Moreover, such structures permit corrosion and the tendency of the steel filament cord to move out of the side of the belt, to catch moving parts of the mechanical device. Such difficulties result in a timing belt construction which is unsatisfactory and a timing belt that possesses a short operating lifetime.

It follows that great manufacturing difficulties are introduced to overcome the above described deficiencies of having the reinforcement material emerge from the belt assembly sidewalls.

The above-described drawbacks and shortcomings of the prior art belt constructions and the conventional method of manufacturing timing belts and other types of V-belts or drive belts, and the secondary difficulties associated with the manufacture of such belt structures will be hereinafter described with reference to FIGS. 1–7.

Figure 1:
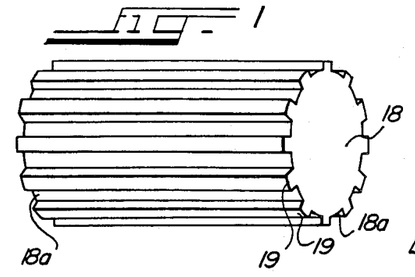
FIG. 1 is a perspective view illustrating the cylindrical metal mandrel utilized in manufacturing belt assemblies or constructions.
Figure 2:
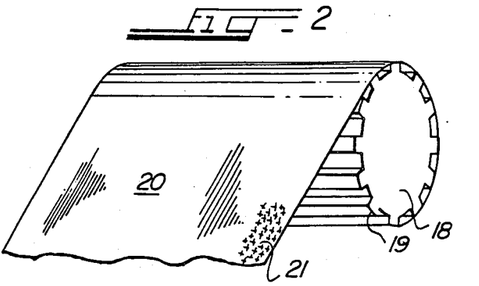
FIG. 2 is a perspective view illustrating the application of polymeric matrix material to the metal mandrel in accordance with the prior art.

As shown in FIG. 1, a cylindrical metal mold or mandrel 18 having longitudinally extending grooves 18a or teeth 19 on the outer surface thereof is provided as the former for the belt construction. In FIG. 2, a strip of uncured polymeric matrix material 20 is positioned about the outer surface of the metal mandrel 18 to provide the gear tooth engaging wear surface 14 portion of the prior art belt construction or assembly 30. The strip of polymeric matrix material 20 may be wrapped several times around the mandrel 18 to provide a wear and friction surface portion of a belt assembly and is comprised of a reinforcing fiber material 22 disposed substantially uniformly throughout the polymeric matrix material 20 to provide the gear-tooth wear surface portion 14 of the belt assembly 30. During manufacture, the application of the strip of polymeric matrix material 20 is sufficient to provide the desired buildup and thickness of the gear-tooth wear surface portion of the prior art belt assembly 30.

Figure 3:
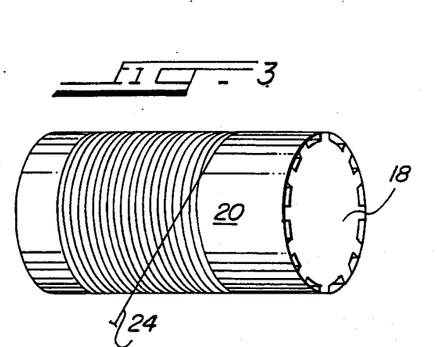
FIG. 3 is a perspective view illustrating the winding of a reinforcing cord or filament around the mandrel during a step in the manufacture of the reinforced belt assembly in accordance with the prior art.

As shown in FIG. 3, the next step in the process for manufacturing a cog or tooth-type belt construction or assembly 30 is the positioning of the reinforcing cord or filament 24 about the strip of polymeric matrix material 20. Generally, as described in U.S. Pat. No. 3,188,254, the reinforcing cord 24 is spirally spun around the periphery of the strip of polymeric matrix material 20 and applied under high tension. The reinforcing cord 24 may be of such material such as nylon, rayon, polyester, glass fibers or steel and the application of the cord about the mandrel assists the polymeric matrix material 20 in flowing into the grooves 18a between the longitudinal teeth 19 of the mandrel 18.

Figure 4:
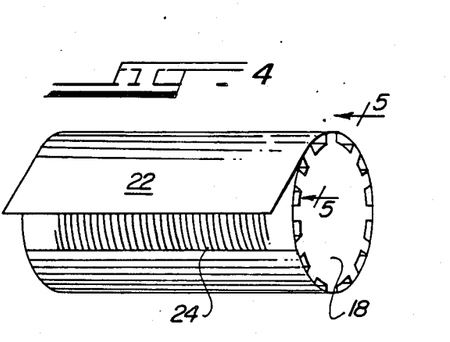
FIG. 4 is a perspective view illustrating the securing of an outer rubber layer material to the wrapped belt assembly shown in FIG. 3.
Figure 5:
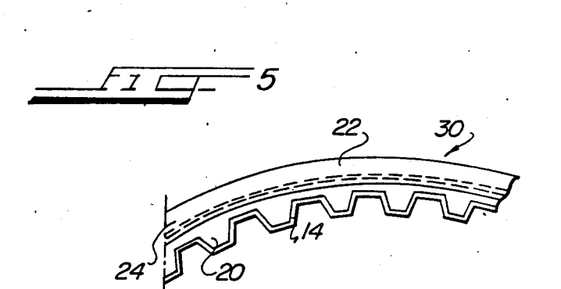
FIG. 5 is a cross-sectional view taken along lines 5—5 of FIG. 4.
Figures 6, 7, 8:
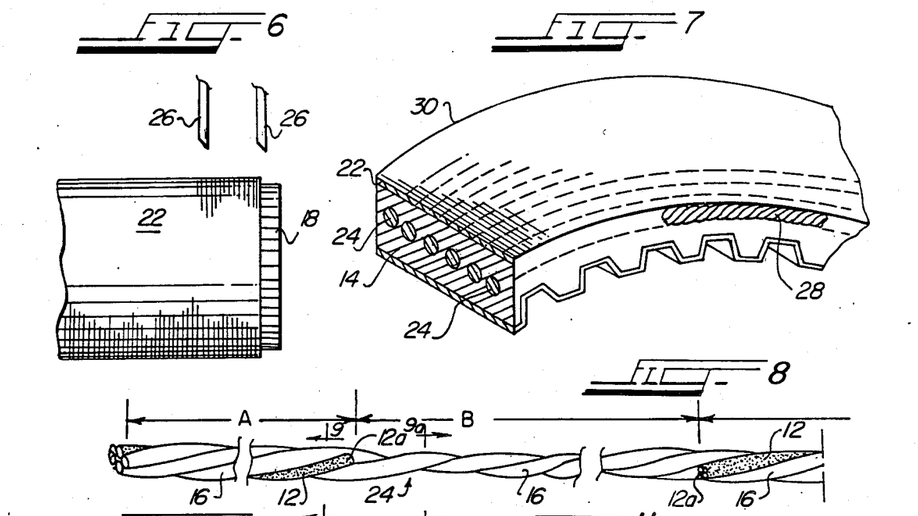
FIG. 6 is a fragmentary isometric view illustrating the cutting of the belt sleeve after curing to produce the endless reinforced belt construction in accordance with the prior art.
FIG. 7 is a fragmentary isometric view with parts in cross section illustrating a typical belt construction in accordance with the prior art.
FIG. 8 is a fragmentary isometric view of one embodiment of a reinforcing material containing a reinforcing member and a discontinuous portion thereof having a carrier fiber therebetween in accordance with the present invention.

After the reinforcing cord or filament 24 has been wound about the mandrel 18, as shown in FIG. 4, an additional sheet or cover layer 22 of a plastomeric or rubber material, of a type known to those skilled in the art, is positioned around the wound reinforcing cord and matrix material and stitched thereon to complete the raw uncured tubular sleeve of belting material. Thereafter, tubular sleeve and mandrel assembly is positioned in a conventional steam vulcanizing process, which is well known in the art, to complete the vulcanizing process of the belt assembly. During curing or vulcanization, there is additional flow of rubber or elastomeric material throughout the composite structure to provide a cured integral belt sleeve, the composite as shown in cross-section in FIG. 5. Thereafter, as shown in FIG. 6, the cured belt sleeve on the mandrel is removed from the curing mold and cut by knives 26 into individual belt constructions or assemblies 30, as shown in FIG. 7 and disclosed in U.S. Pat. No. 4,487,814. As shown in FIGS. 3 and 7, because the reinforcing cord or filament 24 is spirally wound about the mandrel, when the individual belts are cut from the cured sleeve, the cutting operation necessarily provides a plurality of areas on the cut side of the belt assembly 30 where the steel reinforcing cord or filament 24 is exposed along the side and at the ends, as shown by 28 in FIG. 7. These exposed ends permit corrosion within the belt assembly, which reduces operating lifetimes of the belt assembly 30, and permit the steel filament or other reinforcing cord to move out of the side of the belt to catch on the mechanical devices driving the drive belt.

SUMMARY OF THE INVENTION

One object of the present invention is to provide a novel reinforced belt construction which is cut from a cured belt sleeve wherein the reinforcing cord or filament material is positioned and sealed within the body of the belt construction.

A further object of the present invention is to provide a reinforcing cord or filament material comprised of a reinforcing filament or cord member and a carrier member, which is continuous in length of the reinforcing material and wherein the reinforcing cord is discontinuous in length over the entire length of the reinforcing material, which reinforcing material permits the winding upon a mandrel of discrete winds of the reinforcement filament or cord separated by discrete winds about the mandrel of the carrier fiber, which structure permits the subsequent cutting of belt assemblies wherein the reinforcing filament is positioned and sealed within the body of the belt construction.

Still another object of the present invention is to provide a novel method of manufacturing belt assemblies or constructions which provide uniform cut belt assemblies without sacrifice of manufacturing efficiency and productivity.

A further object of the invention is to provide a novel reinforcing material containing either a filament or cable construction which is discontinuous in length within the reinforcing material, with the portion of the material between the discontinuous ends of the filament or cable being comprised of a material that is compatible, upon curing with the polymeric matrix composition comprising the belt assembly.

DETAILED DESCRIPTION

Referring now to the drawings of FIGS. 8-12, wherein like numerals have been used throughout the several views to designate the same or similar parts, in FIG. 8 there is shown a reinforcing cord or filament material 24 which is continuous in length and which is comprised of a reinforcing member 12, discontinuous in length, and a plurality of carrier members or means 16 braided about the reinforcing member or means 12 and extending the length of the filament material 24 such that when the reinforcing cord or filament material 24 is drawn or pulled and deposited about the mandrel 18, the carrier members 16 confine and pull the reinforcing member 12 therealong. The carrier member or means may be a tubular or flat braid, a conventional cable structure, an extruded jacket or a narrow thin film tape material.

Figure 9:
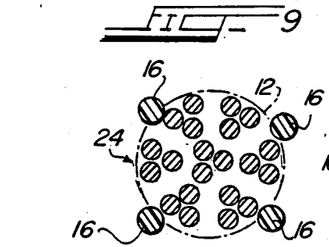
FIG. 9 is a cross-sectional view taken along lines 9—9 of FIG. 8.
Figures 9A, 11:
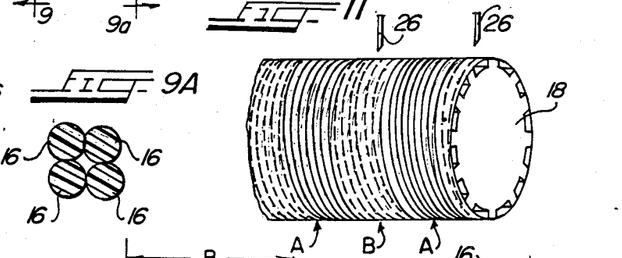
FIG. 9A is a cross-sectional view taken along lines 9A—9A of FIG. 8.
FIG. 11 is a fragmentary perspective view illustrating the cutting of the belt sleeve after curing and cooling to provide an endless reinforced belt construction in accordance with the present invention.

FIG. 9 is a cross-sectional view of the reinforcing cord or filament material 24, as shown in FIG. 8, and schematically represents a 7×3×0.0058 inch brass or zinc plated steel reinforcing cable member 12 which is substantially centered within four 0.01 inch nylon monofilament carrier members 16 that have been braided around the 7×3 reinforcing member 12 member or construction. As shown in FIG. 8, the reinforcing cord or filament material 24 is comprised of a plurality of carrier members 16 that extend the entire length thereof, with the reinforcing cable member 12 being discontinuous in length with respect to the reinforcing cord or filament material 24 and carrier members 16. Also, as shown in FIG. 8, section A represents a first section or portion of the reinforcing cord or filament material 24 having four carrier members 16 braided about the reinforcing metal cable member 12. At the end 12a of the reinforcing member 12, the carrier members continue to form a section or portion B, which is devoid of any reinforcing cable member 12, and section B terminates at the end 12a to include a discrete and predetermined length of the reinforcing material 24 containing a reinforcing member 12 with braided carrier member 16 therearound. FIG. 9A is a schematic cross-sectional view of section B showing the four nylon filament carrier members 16. As is understood, the overall length of reinforcing material 24 will be such that it may be supplied in coil form and that the length of section A would be sufficient to provide the desired number of turns or wraps around the mandrel 18.

Figure 12:
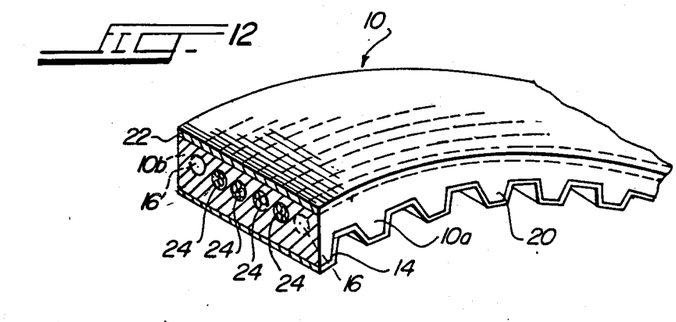
FIG. 12 is a fragmentary isometric view with parts in cross-section illustrating a reinforced belt construction in accordance with the present invention.

When such a continuous length of reinforcing material 24 is wrapped or wound continuously about a strip of polymeric matrix material 20 that has been positioned on the outer surface of a metal mandrel 18 as shown in FIG. 3, the resultant configuration of the wound reinforcing cord material 24 is depicted and shown in FIG. 11. There, section G illustrates continuous wraps or windings of the carrier member 16 and section A represents discrete wrappings of the reinforcing material 24 having the reinforcing member 12 therein. Thus, after the sheet or cover layer portion 22 of the belt assembly 10 is positioned around the wound reinforcing material and stitched thereon, the resultant sleeve and mandrel are placed in a chamber and cured or vulcanized, as is well known in the art. After curing, knives 26 are positioned adjacent the cured sleeve and the precise width or reinforced belt 10 are cut from the cured sleeve. The knives 26 engage the cured sleeve in the area defined by section B, between sections A, to provide the novel reinforced belt construction in accordance with the present invention, as shown in FIG. 12. As is depicted in FIG. 12, the sidewalls 10a and 10b (not shown) of the belt assembly or construction 10 do not have any reinforcing member 12 extending outwardly therethrough and the reinforced belt assembly or construction 10 provides a sealed and uniformly reinforced belt construction which has herefore been unattainable in the art. As depicted in FIG. 12, it is shown that the center within the cut belt assembly 10 are four continuous wraps of the reinforcing material 24 containing the reinforcing member 12 therein with the two outside wraps representing the continuous carrier member 16 only. Thus, during curing of the composite reinforced belt assembly, the carrier members 16 may be comprised of a cotton-polyester quilt yarn, such as carpet thread, button thread, nylon or other polymer material which may possess the property of substantially fusing or interacting with the cured body portion of the belt assembly to substantially disappear after curing. On the other hand, retention of the carrier member identify in the cured belt sleeve, may be desirable to facilitate controlling the ends 12a of the reinforcing member within the cured composite. Additionally, it may be desired to enhance the fixation of the reinforcing member end 12a to the carrier member 16 by variety of means, such as, gluing, heat sealing, auxilliary wrapping or by changing the pitch of the carrier member overlapping the end 12a of the reinforcement member 12.

Additionally, it is within the scope of the present invention that the reinforcing member 12 may be any type of carbon steel or other metal cords, such as, stainless steel, aluminum and the like, or may be a cable, tubular or flat braid, a ribbon or single metal filament and the carrier members may be glass fibers, aramid fibers, teflon fibers or polyurethane fibers, nylon fibers, or natural or synthetic yarns in the geometric form of tapes, extruded or dipped jackets or filaments. Importantly, the reinforcing member possesses a Young's modules greater than the Young's modulus of any other component of the composite belt assembly. For example, a further example of a useful reinforcement material 24 in accordance with the present invention includes a reinforcing member portion comprising 5 strand cable comprised of 0.010 inch brass plated stainless steel cord substantially centered within a carrier member portion comprised of four 0.015 inch nylon monofilaments or within four 0.009 inch cotton-polyester yarn threads. In the present illustration of this invention, it is preferred that the reinforcing member 12 is discontinuous so as to facilitate forming or cutting in specific locations within the reinforced belt sleeve construction. However, it is within the scope of the present invention that the discontinuity suggested may be the absence of the reinforcing member over a specific length of the reinforcing material 24 or may be in the form in the change in the properties of the reinforcing member 12 over a specific length of the reinforcing member 24, such as, for example, the reinforcing member or portion 12 may be heat treated or softened and thereby extend continuously through section B.

Figure 10:
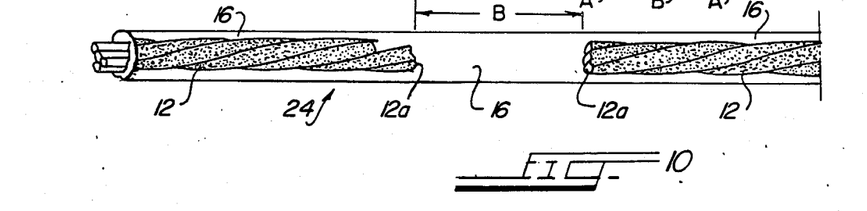
FIG. 10 is a fragmentary isometric view of still another embodiment of the reinforcing material having a discontinuous portion throughout the length thereof and an extruded covering extending the length thereof in accordance with the present invention.

FIG. 10 illustrates a further embodiment of the present invention wherein the reinforcing cord or filament material 24 includes a reinforcing member or portion 12 comprised of a four wound wire cable. Surrounding or encapsulating the reinforcing member 12 is a non-metallic extrudate, coating, wrapping or carrier member 16 which extends along the entire length of the material 24, with the reinforcing member 12 having an end 12a, thereof to define the gap or section B therebetween. Thus, as previously set forth, when the reinforcing cord or filament material 24, as shown in FIG. 10, is wound around the mandrel, discrete regions A having the wire reinforcing member 12 therein followed by discrete wraps of the non-metallic extrudate 16, as represented by Section B, and followed by a distinct region of reinforcing member 12 covered by the extrudate, the structure illustrated in FIG. 11. Such a structure provides a cable reinforced belt construction 10 having the reinforcing cable or member 12 embedded therein with the outside walls 10a and 10b being free of any reinforcing member cut ends. In such an embodiment, the extrudate or carrier member 16 may be a rubber base material, of the same composition of the reinforced belt construction and upon curing thereof, provides a uniform composite belt assembly or construction, as shown in FIG. 12. However it may be desirable to retain the extrudation carrier member identity in cured belt sleeve, to facilitate controlling the ends 12a of the reinforcing member 12 within the cured composite. and upon curing thereof, provides a uniform composite belt construction. Also, as shown in FIGS. 8 and 10, the reinforcing member portion 12 of the reinforcing material 24 may be a stranded cable structure having the carrier members 16 stranded therewith or the carrier members may be braided about the central core of a strand. Such a reinforcing material 24 may be produced, for example, on a flat or tubular braider. It is merely sufficient that the carrier members 16 have sufficient strength to retain the cable member 12 and permit transport and winding of the same upon the mandrel 18, during manufacture. Moreover, as shown, the braided carrier member 16 may be comprised of various types of materials and may be comprised of mixtures of various materials to provide the unique and novel composite reinforced belt construction in accordance with the present invention.

The present disclosed reinforcement material 24 having discontinuous properties over its length has particular application as a reinforcement material for belt assemblies and reinforced hose structures. The reinforcement material may include a plurality of predetermined lengths of a reinforcing member 12, as shown in 10, wherein the carrier member 16 is affixed to the ends 12a of member 12 and connects the predetermined lengths of reinforcing member 12. Such affixation may be by shrinking a heat shrinkable carrier material or by gluing the ends 12a to the connecting bridge or carrier member 12. One example of such a construction is a tubular polymer carrier member 12 which is heat shrunk or sealed around the ends 12a of the cable reinforcing member 12. Such a construction of the reinforcing material 24 provides for the precise anchoring and retaining of the reinforcing member 12 during spirally winding of material 24 about the mandrel and prevents migration of the cable reinforcement during curing of the assembly.

The present disclosed reinforcement material 24 having discontinuous properties over its length may be used on the reinforcement material for polymer based matrix structures. Examples of such structures such as a reinforced hose may be beneficially fabricated wth reinforcement material having discontinuous properties in the vicinity of the hose couplings. A tire belt may be advantageously produced from a reinforcement material having discontinuous properties in the vicinity of the belt edges. Accordingly, the present invention broadly describes a unique and novel class of reinforcement materials that may be incorporated within any polymeric composite assembly requiring termination or geometrical transition of the reinforcement material.

What has been described is a unique and novel reinforced belt assembly or construction, a novel reinforced composite assembly and a novel method of manufacture of such reinforced belt assemblies.

I claim:

1. A reinforced polymeric belt construction comprising: a gear-tooth engaging portion, a reinforcing material portion positioned about said gear-tooth engaging portion, said reinforcing material portion being comprised of a continuous length of a reinforcing member and a continuous length of a carrier member having a length greater than said reinforcing member, with said reinforcing member having a Young's modulus value greater than said carrier member, and wherein said reinforcing material portion includes a plurality of spiral wraps of said reinforcing member with at least a portion of one wrap on each side of t he wraps of said reinforcing member being comprised of said carrier member, and a layer of covering material positioned about said reinforced material portion.

2. The reinforced belt construction in accordance with claim 1 wherein said reinforcing member is steel.

3. The reinforced belt construction in accordance with claim 1 wherein said reinforcing member is stainless steel.

4. The reinforced belt construction in accordance with claim 2 wherein said reinforcing member is coated with a material selected from a group comprising, brass, zinc or organic adhesive.

5. The reinforced belt construction in accordance with claim 3 wherein said reinforcing member is coated with a material selected from a group comprising, brass, zinc or organic adhesive.

6. The reinforced belt construction in accordance with claim 1 wherein said reinforcing member is a metal and said carrier member is selected from a group comprised of polymers, glasses, natural fibers or mixtures thereof.

7. The reinforced belt construction in accordance with claim 1 wherein said reinforcing member is in the configuration of a cable.

8. The reinforced belt construction in accordance with claim 7 wherein said carrier member is at least one filament braided about said cable reinforcing member.

9. The reinforced belt construction in accordance with claim 7 wherein said carrier member is at least one filament stranded into a cable configuration with said cable reinforcing member.

10. The reinforced belt construction in accordance with claim 7 wherein said carrier member is a non-metallic extrudate surrounding said cable reinforcing member.

11. The reinforced belt construction in accordance with claim 10 wherein said non-metallic extrudate is a rubber based material.

12. The reinforced belt construction in accordance with claim 1 wherein said gear-tooth engaging portion is reinforced.

13. The reinforced belt construction in accordance with claim 7 wherein said carrier member is in the form of a tape with said cable reinforcing member adhered thereto.

14. The reinforced belt construction in accordance with claim 1 wherein said discontinuous length of said reinforcing member portion is provided by heat treating predetermined lengths of said reinforcing member.

15. The reinforced belt construction in accordance with claim 1 wherein said reinforcing member includes ends attached to said carrier member.

16. The reinforced belt construction in accordance with claim 15 wherein said attachment is by an adhesion material.

17. The reinforced belt construction in accordance with claim 15 wherein said attachment is by reducing the lay length of said carrier member and said ends.

18. A reinforcing material for use in reinforcing a polymer component, said reinforcing material being comprised of a continuous length of a reinforcing member and a carrier member, with said reinforcing member being operatively connected to said carrier member having a length greater than said reinforcing member and wherein said reinforcing member has a Young's modulus value greater than said carrier member.

19. The reinforcing material in accordance with claim 18 wherein said reinforcing member is steel.

20. The reinforcing material in accordance with claim 18 wherein said reinforcing member is stainless steel.

21. The reinforcing material in accordance with claim 19 wherein said reinforcing member is coated with a material selected from a group comprising, brass, zinc or organic adhesive.

22. The reinforcing material in accordance with claim 20 wherein said reinforcing member is coated with a material selected from a group comprising, brass, zinc or organic adhesive.

23. The reinforcing material in accordance with claim 18 wherein said reinforcing member is a metal and said carrier member is selected from a group comprised of polymers, glasses, natural fibers or mixtures thereof.

24. The reinforcing material in accordance with claim 18 wherein said reinforcing member is in the configuration of a cable.

25. The reinforcing material in accordance with claim 24 wherein said carrier member is a plurality of filaments braided about said cable reinforcing member.

26. The reinforcing material in accordance with claim 24 wherein said carrier member is a plurality of filaments stranded into a cable configuration with said cable reinforcing member.

27. The reinforcing material in accordance with claim 24 wherein said carrier member is a non-metallic extrudate surrounding said cable reinforcing member.

28. The reinforcing material in accordance with claim 27 wherein said non-metallic extrudate is a rubber based material.

29. The reinforcing material in accordance with claim 24 wherein said carrier member is in the form of a tape with said cable reinforcing member adhered thereto.

30. The reinforcing material in accordance with claim 18 wherein said discontinuous length of said reinforcing member portion is provided by heat treating predetermined lengths of said reinforcing member.

31. The reinforcing material in accordance with claim 18 wherein said reinforcing member includes ends attached to said carrier member.

32. The reinforcing material in accordance with claim 31 wherein said attachment is by an adhesion material.

33. The reinforcing material in accordance with claim 31 wherein said attachment is by reducing the lay length of said carrier member and said ends.

34. A cylindrical reinforced polymer component comprising:
a cylinder of polymeric matrix material;
a reinforcing filament material deposited on said cylindrical polymeric matrix material, said reinforcing filament material comprised of a plurality discontinuous lenths of a reinforcing member and a continuous length of a carrier member to provide a predetermined number of windings having said reinforcing member and said carrier member therein extending around said cylinder and a predetermined number of windings having said carrier member extending around said cylinder;
a cover layer positioned over said deposited reinforcing material to provide the cylindrical reinforced polymer component.

35. The reinforced component in accordance with claim 34 wherein said reinforcing member is steel.

36. The reinforced component in accordance with claim 34 wherein said reinforcing member is stainless steel.

37. The reinforced component in accordance with claim 35 wherein said reinforcing member is coated with a material selected from a group comprising, brass, zinc or organic adhesive.

38. The reinforced component in accordance with claim 36 wherein said reinforcing member is coated with a material selected from a group comprising, brass, zinc or organic adhesive.

39. The reinforced component in accordance with claim 34 wherein said reinforcing member is a metal and said carrier member is selected from a group comprised of polymers, glasses, natural fibers or mixtures thereof.

40. The reinforced component in accordance with claim 34 wherein said reinforcing member is in the configuration of a cable.

41. The reinforced component in accordance with claim 40 wherein said carrier member is a plurality of filaments braided about said cable reinforcing member.

42. The reinforced component in accordance with claim 41 wherein said carrier member is a plurality of filaments stranded into a cable configuration with said cable reinforcing member.

43. The reinforced component in accordance with claim 41 wherein said carrier member is a non-metallic extrudate surrounding said cable reinforcing member.

44. The reinforced component in accordance with claim 43 wherein said non-metallic extrudate is a rubber based material.

45. The reinforced component in accordance with claim 41 wherein said carrier member is in the form of a tape with said cable reinforcing member adhered thereto.

46. The reinforced component in accordance with claim 34 wherein said discontinuous length of said reinforcing member portion is provided by heat treating predetermined lengths of said reinforcing member.

47. The reinforced component in accordance with claim 34 wherein said reinforcing member includes ends attached to said carrier member.

48. The reinforced component in accordance with claim 47 wherein said attachment is by an adhesion material.

49. The reinforced component in accordance with claim 47 wherein said attachment is by reducing the lay length of said carrier member and said ends.

50. A method of manufacturing a cylindrical reinforced polymer component comprising the steps of:
forming a cylinder of polymeric matrix material;
winding spirally on said cylinder of polymeric matrix material in reinforcing filament material comprised of a plurality of discontinuous lengths of a reinforcing member portion and a continuous length of a carrier member portion operatively connected to said reinforcing member portion to provide a predetermined number of windings having said reinforcing member portion and said carrier member portion therein extending around said cylinder and a predetermined number of windings having said carrier member portion extending around said cylinder; and applying a cover layer over said wound cylinder material to provide a cylindrical reinforced polymer component.

51. The method of claim 50 further including the step of curing said cylinder reinforced polymer component.

52. The method of claim 50 wherein said reinforcing member portion is a metal.

53. The method of claim 50 wherein said carrier member portion is selected from a group comprised of polymers, glasses naturally occurring fibers or mixtures thereof.

54. The method of claim 50 wherein said cylindrical reinforced polymer component is a hose.

55. A method of manufacturing a cylindrical reinforced polymer component comprising the steps of:
forming a cylinder of polymeric matrix material;
braiding on said cylinder of polymeric matrix material a reinforcing filament material comprised of a discontinuous length of a reinforcing member portion and a continuous length of a carrier member portion operatively connected to said reinforcing member portion to provide a predetermined number of windings having said reinforcing member portion and said carrier member portion therein extending around said cylinder and a predetermined number of windings having said carrier portion extending around said cylinder; and
applying a cover layer over said braided cylinder material to provide a reinforced cylinder.

56. The method of claim 55 further including the step of curing said reinforced cylinder.

57. The method of claim 55 wherein said reinforcing member portion is a metal.

58. The method of claim 55 wherein said carrier member portion is selected from a group comprised of polymers, glasses, naturally occurring fibers or mixtures thereof.

59. The method of claim 55 wherein said cylindrical reinforced polymer component is a hose.

60. A method of manufacturing an endless reinforced belt assembly comprising the steps of:
depositing a strip of polymeric matrix material around a metal mandrel;
winding spirally on said polymeric matrix material a reinforcing filament material comprised of a plurality of continuous lengths of a reinforcing member and a continuous length of a carrier member having a length greater than said reinforcing member to provide a predetermined number of windings having said reinforcing member and said carrier member extending around said mandrel and at least a portion of the windings having said carrier member extending around said mandrel;
applying a cover member on said reinforcing filament material to provide an uncured reinforced belting sleeve;
curing said reinforced belting sleeve; and
cutting predetermined widths of the cured reinforced belting sleeve in the region where at least a portion of the windings having said carrier member extends around the reinforced belting sleeve to obtain the reinforced belt assembly having the reinforcing member positioned therein.

61. The method of claim 60 wherein said mandrel includes longitudinally extending grooves on the outer surface thereof.

62. A method of manufacturing an endless reinforced belting sleeve comprising the steps of:
depositing a strip of polymeric matrix material around a metal mandrel;
winding spirally on said polymeric matrix material a reinforcing filament material comprised of a plurality of discontinuous lengths of a reinforcing member and a continuous length of a carrier member to provide a predetermined number of windings having said reinforcing member portion and said carrier member extending around said mandrel and at least a portion of the windings having said carrier member extending around said mandrel;
applying a cover member on said reinforcing filament material to provide an uncured reinforced belting sleeve; and
curing said reinforced belting sleeve.

63. The method of claim 62 wherein said mandrel includes longitudinally extending grooves on the outer surface thereof.

64. A reinforcing material for use in reinforcing a polymer sleeve component, said reinforcing material being comprised of a plurality of predetermined lengths of a reinforcing member having ends thereon, with said plurality of predetermined lengths of said reinforcing member being connected together by a carrier member attaching to said ends thereon.

65. The reinforcing material in accordance with claim 64 wherein said carrier member is a heat shrinkable polymeric material attached to said ends of said reinforcing member.

66. The reinforcing material in accordance with claim 64 wherein said reinforcing member is steel.

67. The reinforcing material in accordance with claim 64 wherein said reinforcing member is stainless steel.

68. The reinforcing material in accordance with claim 16 wherein said reinforcing member is coated with a material selected from a group comprising, brass, zinc or organic adhesive.

69. The reinforcing material in accordance with claim 67 wherein said reinforcing member is coated with a material selected from a group comprising, brass, zinc or organic adhesive.

70. The reinforcing material in accordance with claim 64 wherein said reinforcing member is a metal and said carrier member is selected from a group comprised of polymers, glasses, natural fibers or mixtures thereof.

71. The reinforcing material in accordance with claim 64 wherein said reinforcing member is in the configuration of a cable.

72. The reinforcing material in accordance with claim 64 wherein said carrier member is a non-metallic extrudate attaching to said ends of said cable reinforcing member.

73. The reinforcing material in accordance with claim 72 wherein said non-metallic extrudate is a rubber based material.

74. The reinforcing material in accordance with claim 64 wherein said carrier member is in the form of a tape with said ends of said reinforcing member adhesively adhered thereto.

75. A reinforced polymeric belt construction comprising: a driver engaging portion, a reinforcing material portion positioned about said driver engaging portion, said reinforcing material portion being comprised of a predetermined length of a reinforcing member having ends thereon, with a carrier member attached to each of said ends, and wherein said reinforcing portion includes a plurality of wraps of said predetermined length of said reinforcing member positioned about said drive-gear engaging portion, with said carrier member providing attachment of each of said ends of said predetermined length of said reinforcement member on to said driver engaging portion, and a layer of covering material positioned about said reinforced material portion.

76. The reinforcing material in accordance with claim 75 wherein said reinforcing member is steel.

77. The reinforcing material in accordance with claim 75 wherein said reinforcing member is stainless steel.

78. The reinforcing material in accordance with claim 76 wherein said reinforcing member is coated with a material selected from a group comprising, brass, zinc or organic adhesive.

79. The reinforcing material in accordance with claim 77 wherein said reinforcing member is coated with a material selected from a group comprising, brass, zinc or organic adhesive.

80. The reinforcing material in accordance with claim 75 wherein said reinforcing member is a metal and said carrier member is selected from a group comprised of polymers, glasses, natural fibers or mixtures thereof.

81. The reinforcing material in accordance with claim 75 wherein said reinforcing member is in the configuration of a cable.

82. The reinforcing material in accordance with claim 75 wherein said carrier member is a non-metallic extrudate attaching to said ends of said cable reinforcing member.

83. The reinforcing material in accordance with claim 82 wherein said non-metallic extrudate is a rubber based material.

84. The reinforcing material in accordance with claim 75 wherein said carrier member is in the form of a tape with said ends of said reinforcing member adhesively adhered thereto.

* * * * *

UNITED STATES PATENT AND TRADEMARK OFFICE
CERTIFICATE OF CORRECTION

PATENT NO. : 4,631,558
DATED : July 21, 1987
INVENTOR(S) : Doyle W. Rausch

It is certified that error appears in the above—identified patent and that said Letters Patent is hereby corrected as shown below:

Title page:

Under references cited, U.S. Patent Documents, Patent 4,915,397 Wetzel should be -- 4,415,397 Wetzel;

Column 1, line 57, "belts" should be --belt--;
Column 1, line 63, "strength" should be --stretch--;
Column 5, line 43 "G" should be --B--;
Column 6, line 8, "identify" should be --identity--;

Column 9, line 62, "lenths" should be --lengths--;
Column 10, line 58, "in" should be --a--;

Column 11, line 26, after "carrier" insert --member--;

Signed and Sealed this

Twentieth Day of September, 1988

*Attest:*

DONALD J. QUIGG

*Attesting Officer*     *Commissioner of Patents and Trademarks*